United States Patent [19]

Coney et al.

[11] Patent Number: 4,704,309

[45] Date of Patent: Nov. 3, 1987

[54] PRINTING PROCESSES EMPLOYING WATER DISPERSIBLE INKS

[75] Inventors: Charles H. Coney; Theron E. Parsons, both of Kingsport, Tenn.

[73] Assignee: Eastman Kodak Company, Rochester, N.Y.

[21] Appl. No.: 940,880

[22] Filed: Dec. 10, 1986

Related U.S. Application Data

[63] Continuation-in-part of Ser. No. 742,262, Jun. 7, 1985, abandoned.

[51] Int. Cl.$^4$ .......................... B05D 3/10; B05D 5/00
[52] U.S. Cl. .................................... 427/258; 427/288; 427/341; 427/342
[58] Field of Search ............... 260/DIG. 38; 427/258, 427/288, 341, 342

[56] References Cited

U.S. PATENT DOCUMENTS

| | | | |
|---|---|---|---|
| 2,762,719 | 9/1956 | Kleiner et al. | 427/341 |
| 4,145,469 | 3/1979 | Newkirk et al. | 427/341 X |
| 4,148,779 | 4/1979 | Blackwell et al. | 524/908 X |
| 4,335,220 | 6/1982 | Coney | 523/414 |

*Primary Examiner*—Evan K. Lawrence
*Attorney, Agent, or Firm*—William P. Heath, Jr.; J. Frederick Thomsen

[57] ABSTRACT

In a process for printing a substrate employing apparatus elements such as printing plates, engraved rolls, wiping blades, transfer rolls, metering rolls, or the like, and printing ink which comes into contact with the elements and substrate, the improvement comprising carrying out the printing with an ink comprising an aqueous system of colorant and water dispersible polymer having carbonyloxy linking groups in the linear molecular structure wherein up to 80% of the linking groups may be carbonylamido linking groups, the polymer having an inherent viscosity of at least about 0.1 measured in a 60/40 parts by weight solution of phenol/tetrachloroethane at 25° C. and at a concentration of about 0.25 gram of polymer in 100 ml. of the solvent, allowing the ink to substantially dry, and subsequently contacting the dried ink with a solution of one or more multivalent cation salts to impart thereto a high degree of resistance to water dispersibility.

8 Claims, No Drawings

PRINTING PROCESSES EMPLOYING WATER DISPERSIBLE INKS

This is a continuation-in-part application of Ser. No. 742,262 filed June 7, 1985, and now abandoned.

This invention concerns printing processes wherein the printing ink comes into contact with various parts of the printing machine, and particularly concerns the use of a unique printing ink having an excellent overall balance of properties and which greatly facilitates the otherwise troublesome clean-up and press restarting problems such as plate rewetting normally associated with printing operations.

Many of the present commercial printing processes utilize inks containing water-based latices of polymers such as acrylics, polyvinyl acetate, or butadiene-styrene which form water resistant films by evaporation of the water and coalescence of the polymer spheres. Also common are inks based on water solutions of ammoniated or aminated carboxyl-containing polymers which form water resistant films by evaporation of the water and dissipation of the ammonia and amine moieties. With all of these inks, during the printing process, water resistant ink films form on the printing plates, engraved rolls, wiping blades, transfer and metering rolls or other such apparatus elements. The formation of such films is especially troublesome during short term press shutdowns making it difficult or impossible to restart the printing process without an extensive cleaning operation to remove the dried, water insoluble ink film from the press parts.

This invention overcomes the problems of difficult press clean-up and difficult restarting or rewetting of the printing plates and rolls through the use of water-based inks employing certain water-dispersible polyester or poly(ester amide) resins which are rendered substantially nondispersible by a post-printing treatment of the printed surface with a water solution of a multivalent cation salt.

The present invention is thus defined as in a process for printing a substrate employing apparatus elements such as printing plates, engraved rolls, wiping blades, transfer rolls, metering rolls, or the like, and printing ink which comes into contact with said elements and said substrate, the improvement comprising carrying out the printing with an ink comprising an aqueous system of colorant such as a dye and/or pigment and water dispersible polymer having carbonyloxy linking groups in the linear molecular structure wherein up to 80% of the linking groups may be carbonylamido linking groups, the polymer having an inherent viscosity of at least about 0.1 measured in a 60/40 parts by weight solution of phenol/tetrachloroethane at 25° C. and at a concentration of about 0.25 gram of polymer in 100 ml. of the solvent, the polymer containing substantially equimolar proportions of acid equivalents (100 mole percent) to hydroxy and amino equivalents (100 mole percent), the polymer comprising the reaction products of (a), (b), (c) and (d) from the following components or ester forming or esteramide forming derivatives thereof;

(a) at least one difunctional dicarboxylic acid;
(b) from about 4 to about 25 mole percent, based on a total of all acid, hydroxyl and amino equivalents being equal to 200 mole percent, of at least one difunctional sulfomonomer containing at least one sulfonate group attached to aromatic nucleus wherein the functional groups are hydroxy, carboxyl or amino;
(c) at least one difunctional reactant selected from glycols having two —CH$_2$OH groups or mixtures of such glycols and diamines having two —NRH groups, wherein
   (1) at least 15 mole percent of the glycol based on the total mole percent of hydroxy or hydroxy and amino equivalents in the difunctional reactant is poly(ethylene glycol) having the structural formula

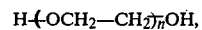

n being an integer of from about 2 to about 20, or wherein
   (2) from about 0.1 to less than about 15 mole percent of the glycol based on the total mole percent of hydroxy or hydroxy and amino equivalents in the difunctional reactant, is poly-(ethylene glycol) having the structural formula

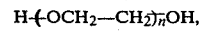

n being an integer of between 2 and about 500, and with the proviso that the mole percent of said poly(ethylene glycol) within said range is inversely proportional to the quantity of n within said range; and
(d) from none to at least one difunctional reactant selected from a hydroxycarboxylic acid having one —CH$_2$—OH, an aminocarboxylic acid having one —NRH group, an amino-alcohol having one —CR$_2$—OH group and one —NRH or mixtures thereof, wherein each R or R$_2$ above is a H atom or an alkyl group of 1 to 4 carbon atoms, allowing said ink to substantially dry, and subsequently contacting the dried ink with a solution of one or more multivalent cation salts to impart thereto a high degree of resistance to water dispersibility.

It is noted that the sulfonate cation of the above polymer can be any of H$^+$, Na$^+$, K$^+$, Li$^+$, or the cations of primary, secondary or tertiary aliphatic and arylamines.

The water-dispersible printing inks may be prepared, for example, as disclosed in U.S. Pat. No. 4,148,779 incorporated herein by reference. The treatment of the printed surface with a metal cation salt may be carried out as disclosed in Defensive Publication No. T949,001 dated Aug. 3, 1976, incorporated herein by reference. The water-dispersible polymers are prepared as disclosed in U.S. Pat. Nos.: 3,734,874; 3,779,993; and 4,233,196, the disclosures of which are incorporated herein by reference. These polymers are formulated, for example, into water-based flexographic, gravure, and screen-process printing inks which upon drying in the press maintain a sufficient degree of water dispersibility to allow rapid rewetting of the rolls and plates on restarting of the press and to allow easy clean-up of the press with water, especially soapy water. The dried ink film on the printed substrate product is subsequently contacted with an aqueous solution of a multivalent metal cation salt to produce a printed surface with a high degree of water dispersibility resistance. The required time of contact is less than about two seconds, and may be no greater than one second or a fraction thereof and the treatment solutions may consist of any one or mixtures of water soluble salts of multivalent metal cations such as aluminum, nickel, calcium, cadmium, copper, or iron, or with polyvalent cationic organic species such as quaternized polyamine compounds, wherein the atomic ratio of multivalent cation to monovalent salt cation is from about 0.0001 to about 1.0, or in terms of the aqueous solution, at concentrations of from about 0.5% by weight thereof to maximum salt solubilities (saturated solutions). Preferred concentrations are from about 1% to about 12% by weight of the aqueous solution and the preferred salt is aluminum sulfate.

An important adjunct to the present invention is the modification of the above process by the additional incorporation of sequestered paraffin at a concentration based on non-volatile weight (including pigment) of from about 0.1 to about 50%, preferably from about 1.0 to about 10%, into the aqueous ink to further improve the resistance to water dispersibility of the post treated ink. This paraffin sequestering technology is disclosed in detail in my U.S. Pat. No. 4,335,220, the disclosure of which is incorporated herein by reference, with particular reference to Example 4 thereof. Another important adjunct of the present invention is the modification of the above processes by the additional step of heating of the printed surface, for example, from about 200° F. to about 280° F. for a period of from about 10 seconds to about 5 minutes.

Preferred embodiments of the invention are as set out in the specific examples given below and in the claims hereof.

The above defined polymers are excellent film formers for water-based printing inks, forming stable dispersions in water and producing tough, flexible films on drying. No wetting agents or solvents are required for inks containing these polymers and films thereof will form at all practical temperatures above its freezing point. The polymers in dispersion form may be plasticized if necessary with certain water immiscible phthalate esters to high degrees of flexibility. The inks dry rapidly upon printing but have long "open" times in a container open to the atmosphere, such as a printing press fountain. The inks wet surfaces well and have excellent adhesion to an enormous variety of substrates including plastic films, aluminum foil and paper. Both the 100% solid polymers and the corresponding aqueous dispersion may be pigmented by conventional techniques, and high gloss prints may be obtained therefrom. The prints have moderate water dispersibility resistance upon heating and when post treated with the aforesaid salts produce films with excellent resistance to water dispersibility.

The following procedure is preferred for dispersing the polymers in water: The water should be preheated to about 180° F. to about 200° F. and the polymer pellets added rapidly to the vortex under high shear stirring. A Cowles Dissolver, Waring Blender, or similar equipment may be used. Once the water is heated to the desired temperature, additional heat input is not required. Depending upon the volume prepared, dispersion of the pellets should be complete within 15 to 30 minutes stirring. Continued agitation with cooling may be desirable to prevent thickening at the surface due to water evaporation. Viscosities of the dispersions remain low up to polymer levels of 25–30% and viscosities increase sharply above these levels. Viscosities of the dispersions will be influenced by the degree of polymer dispersion obtained which is affected by the dispersing temperature, shear, and time. The polymer content typically may range from about 15% to about 50% by weight of the aqueous dispersion with the preferred for most applications being from about 26% to about 38%. The polymer content of the finished ink may vary from about 15% to about 40% by weight of the ink, with from about 24% to about 36% being preferred.

The printing ink may be prepared as follows: The pigment is added to the polymer dispersion and, at a properly adjusted viscosity, dispersed thereinto with ball mill, sand mill, high-shear fluid flow mill, Cowles Dissolver, Katy Mill or the like. The pigments also may be dispersed directly in the polymer by milling on a heated two-roll mill at about 220°–360° F. and using processing aids as desired, such as solvents or plasticizers. The viscosity and printing characteristics of the ink may be modified further by addition of water, solvents, plasticizers, sequestered wax, surfactants and the like to suit the particular printing needs.

The present process is not limited to any type of dye, pigment, filler, or the like, all of which are hereinafter included in the term "colorant," and can accommodate any colorant which can be dispersed, milled, mixed, blended or dissolved in any manner in either the polymer, water or aqueous polymer system. Useful categories of pigments include extenders, inorganic color, organic color, carbon black, metallic, and disperse, acid and basic dyes. Typical pigments are clays, $TiO_2$, phthalocyanine blue, quinacridones, carbonates, silicates, oxides, Lithol Red, Rubine Red, BON Maroon, Diarylide Yellows, channel black, furnace black, bone black, aluminum flake and bronze flake. It is noted that pigments such as acid dyes having large amounts of ionizable cations are not preferred since they interfere with the water dispersibility of the polymer. The pigment can comprise, e.g., from about 0.5 to about 50% or more, preferably from about 10 to about 30% by weight of the finished or press-ready ink.

The following is an example of the use of the present invention on a Webtron Flexographic Press.

The ink is prepared as above described comprising the following: 100 g. of polymer having an I.V. of about 0.35 and a No. 3 Zahn Cup viscosity of 25 seconds prepared from 88 moles of isophthalic acid, 12 moles of 5-sodiosulfoisophthalic acid, 8 moles of ethylene glycol, and 92 moles of diethylene glycol; 100 g. of Diarylide Yellow pigment; 240 g. of water; and 60 g. of ethanol.

This ink is placed in the ink well of the first station of the press, a 10% by weight solution in water of aluminum sulfate is placed in the ink well of the last station of the press, a roll of clay filled paper is mounted (threaded) in the press, and the press started and set for about 300 ft./min. The ink is picked up on an Anilox roll, transferred thereby to a rubber printing plate mounted on a roll, and impressed thereby onto the paper web. The printed paper proceeds through a drying oven at 120° F. for about 1 second, and then to the last station wherein the printed surface is contacted by a rubber roll wetted with the aluminum sulfate solution to deposit a thin layer thereof on the printed surface. The paper then proceeds to a drying oven to be dried as above and the paper then rolled up on a take-up roll. The print quality and resistance to water dispersibility is excellent. The clean-up with soapy water or alcohol/water mixture of the rolls, plates and other press parts is very easy and represents a great improvement. No blocking of the printed paper on the take-up is experienced.

The invention has been described in detail with particular reference to preferred embodiments thereof, but it will be understood that variations and modifications can be effected within the spirit and scope of the invention.

We claim:

1. In a process for printing a substrate employing apparatus elements such as printing plates, engraved rolls, wiping blades, transfer rolls, metering rolls, or the like, and printing ink which comes into contact with said elements and said substrate, the improvement comprising carrying out the printing with an ink comprising an aqueous system of colorant and water dispersible polymer having carbonyloxy linking groups in the linear molecular structure wherein up to 80% of the linking groups may be carbonyl-amido linking groups, the polymer having an inherent viscosity of at least about 0.1 measured in a 60/40 parts by weight solution of phenol/tetrachloroethane at 25° C. and at a concentration of about 0.25 gram of polymer in 100 ml. of the solvent, the polymer containing substantially equimolar proportions of acid equivalents (100 mole percent) to hydroxy and amino equivalents (100 mole percent), the polymer comprising the reaction products of (a), (b), (c) and (d) from the following components or ester forming or esteramide forming derivatives thereof;

(a) at least one difunctional dicarboxylic acid;

(b) from about 4 to about 25 mole percent, based on a total of all acid, hydroxyl and amino equivalents being equal to 200 mole percent, of at least one difunctional sulfomonomer containing at least one sulfonate group attached to aromatic nucleus wherein the functional groups are hydroxy, carboxyl or amino;

(c) at least one difunctional reactant selected from glycols having two —CH$_2$OH groups or mixtures of such glycols and diamines having two —NRH groups, wherein (1) at least 15 mole percent of the glycol based on the total mole percent of hydroxy or hydroxy and amino equivalents in the difunctional reactant is poly(ethylene glycol) having the structural formula

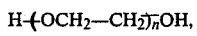

n being an integer of from about 2 to about 20, or wherein (2) from about 0.1 to less than about 15 mole percent of the glycol based on the total mole percent of hydroxy or hydroxy and amino equivalents in the difunctional reactant, is poly(ethylene glycol) having the structural formula

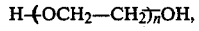

n being an integer of between 2 and about 500, and with the proviso that the mole percent of said poly(ethylene glycol) within said range is inversely proportional to the quantity of n within said range; and (d) from none to at least one difunctional reactant selected from a hydroxycarboxylic acid having one —CH$_2$—OH, an aminocarboxylic acid having one —NRH group, an amino-alcohol having one —CR$_2$—OH group and one —NRH or mixtures thereof, wherein each R or R$_2$ is an H atom or an alkyl group of 1 to 4 carbon atoms, allowing said ink to substantially dry, and subsequently contacting the dried ink with a solution of one or more multivalent cation salts to impart thereto a high degree of resistance to water dispersibility.

2. The process of claim 1 wherein said difunctional sulfomonomer (b) is a dicarboxylic acid and constitutes about 8 mole percent to about 50 mole percent based on the sum of all acid equivalents.

3. The process of claim 1 wherein the salt metal is selected from the group consisting of Al, Ni, Ca, Cd, Cu, and Fe, and the aqueous salt solution has a concentration of from about 0.5% to maximum salt solubilities.

4. The process of claim 1 wherein the salt is aluminum sulfate.

5. The process of claim 1 wherein said dried ink is subsequently contacted with said solution for a period less than about two seconds.

6. The process of claim 1 wherein the water dispersible polymer is a linear copolyester the acid component of which is comprised of from about 8 mole % to about 45 mole % of at least one dicarboxylic acid containing a —SO$_3$M group attached to an aromatic nucleus of from about 6 to about 14 carbons, wherein M is selected from H+, Na+, K+, Li+, NH$_4$+, and the cations of primary, secondary and tertiary aliphatic and aryl amines, the remainder being at least one dicarboxylic acid selected from aliphatic of from about 6 to about 30 carbons, cycloaliphatic of from about 4 to about 12 carbons, and aromatic of from about 6 to about 14 carbons, and the diol component of which comprises at least about 20 mole percent of poly(ethylene glycol) having the formula

wherein n is an integer of from 2 to about 14, the remainder being at least one diol of from about 2 to about 28 carbons.

7. The process of any of claims 1-5 wherein the copolyester acid is comprised of 80-92 mole % isophthalic acid and conversely 8-20 mole % 5-sodiosulfoisophthalic acid, and the diol is at least about 50 mole % diethylene glycol.

8. The process of any of claims 1-5 wherein the copolyester acid is comprised of 80-92 mole % isophthalic acid and 8-20 mole % 5-sodiosulfoisophthalic acid, and the glycol moiety is comprised of 10-80 mole % diethylene glycol, 20-40 mole % 1,4-cyclohexanedimethanol, and 0-50 mole % ethylene glycol.

* * * * *